Oct. 30, 1962  G. E. MITCHELL  3,061,103
IRRIGATION DITCH TRASH REMOVER
Filed Oct. 20, 1959  2 Sheets-Sheet 2
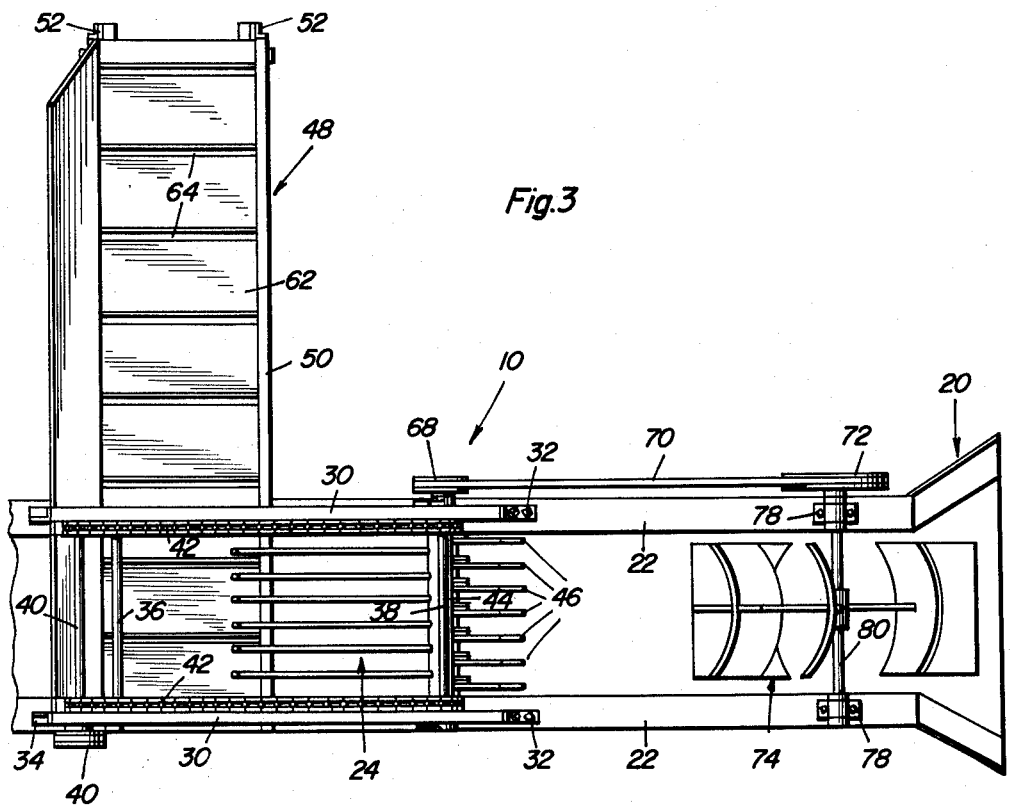
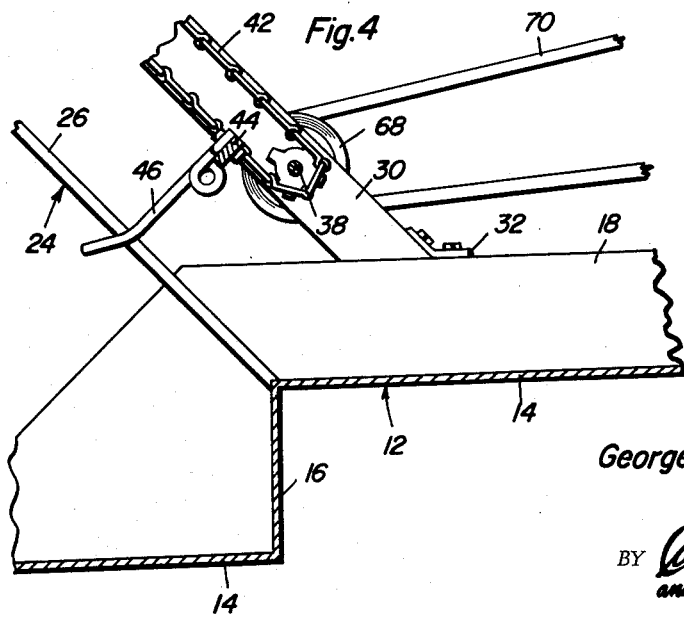
George E. Mitchell
INVENTOR.

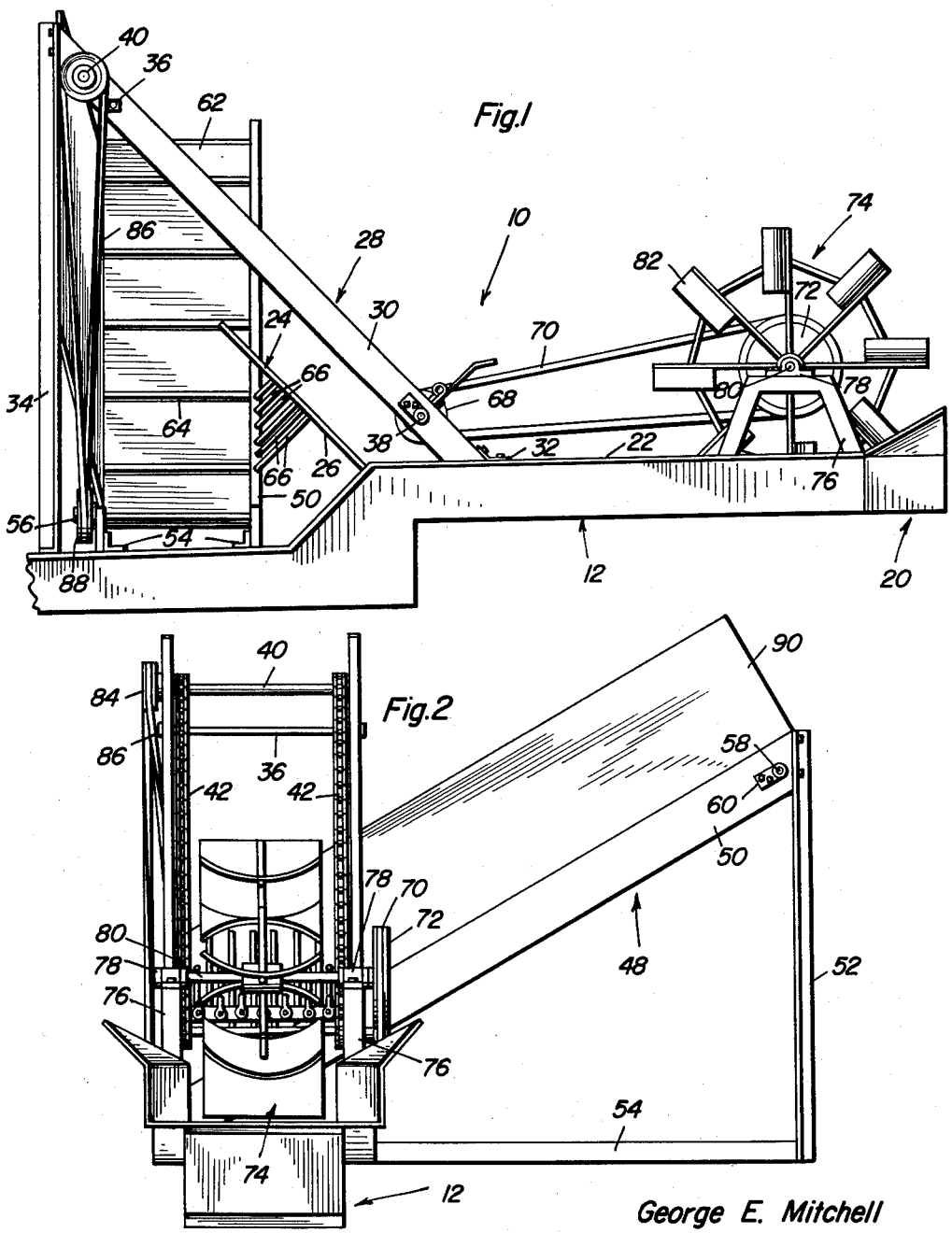

United States Patent Office 3,061,103
Patented Oct. 30, 1962

3,061,103
IRRIGATION DITCH TRASH REMOVER
George E. Mitchell, P.O. Box 502, Basin, Wyo.
Filed Oct. 20, 1959, Ser. No. 847,632
2 Claims. (Cl. 210—156)

This invention relates generally to new and useful improvements in irrigation means, and more specifically relates to a novel trash remover for irrigation ditches.

At the present time, trash in irrigation ditches presents a problem. The trash will flow along the irrigation ditch until it strikes a restriction, at which time it stops and begins to build up. As the trash builds up, in a short time the irrigation ditch is clogged so that either the water will not flow along the irrigation ditch or it overflows the irrigation ditch. Of course, both of these instances are undesirable.

In an attempt to clear irrigation ditches of trash, it has been proposed to place screens in irrigation ditches. While the screens do remove the trash from the flowing water, the trash soon builds up on the screen, with the result that it clogs the flow of the irrigation ditch. The trash, of course, can be continuously removed if sufficient attention is given to the removal thereof. This, unfortunately, requires too much time and attention on the part of the individual and therefore is not feasible.

It is, therefore, the primary object of this invention to provide a trash remover for irrigation ditches which will not only remove the trash from the flowing water but will transfer the trash from the edge of the flowing water to the surrounding ground, thereby completely clearing the irrigation ditch of the undesirable trash.

An object of the invention is to provide a trash remover for irrigation ditches, the trash remover including a bar-type screen which is placed in the irrigation ditch and extends upwardly and downstream of the flowing water so that trash carried by the flowing water will accumulate on the bar screen and will be forced upwardly along the screen by the flowing water, where it may be readily removed.

Another object of the invention is to provide a novel trash remover for irrigation ditches, the trash remover including a bar screen for removing the trash fom the flowing water of the irrigation ditch, a screen cleaner which will automatically remove the trash from the screen, and a conveyor extending transversely of the irrigation ditch for receiving the trash from the screen cleaner and transferring it to the ground adjacent the irrigation ditch where it is out of the way of the flowing water.

A further object of the invention is to provide a novel trash remover for an irrigation ditch, the trash remover being automatic in operation and requiring no attention whatsoever, the trash remover including a water wheel which will drive the movable components thereof, which movable components will automatically serve to transfer trash accumulated by the trash remover to the surrounding ground area.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a side elevational view of the trash remover which is the subject of this invention and shows the general details thereof prior to being set in an irrigation ditch;

FIGURE 2 is a front end view of the trash remover and shows the general relationship of the forward end of the channel for directing the flow of water in the irrigation ditch against the water wheel;

FIGURE 3 is a plan view of the trash remover and shows the specific arrangement of the various components thereof; and FIGURE 4 is an enlarged fragmentary vertical sectional view taken through the lower part of the screen and shows the specific details of mounting of the individual bars of the screen in respect to the base of the channel and the specific details of the screen cleaner.

Referring now to the drawings in detail, it will be seen that the irrigation ditch trash remover, which is the subject of this invention, is referred to in general by the reference numeral 10. The irrigation ditch trash remover 10 includes a channel defining base, generally referred to by the numeral 12. The base 12 may be formed of any suitable materials, although steel and concrete are preferred. The base 12 includes a bottom 14 which has an offset intermediate portion 16 so that there is a drop in the level of the water of the irrigation ditch as it passes the screen of the trash remover, the thus accelerated water driving the trash upwardly on said screen. The base 12 also includes side panels 18 which extend upwardly from the outer edges of the bottom 14. The forward end of the base 12 is outwardly flared, as is best illustrated in FIGURE 3, the flared portion of the base 12 being referred to by the numeral 20. The flaring of the base 12 is to facilitate the flow of water from the natural irrigation ditch formation into the channel defined by the base 12.

At this time, it is also pointed out that the base 12 includes a pair of mounting flanges 22. The mounting flanges 22 are formed at the upper edges of the side walls 18 and extend outwardly therefrom.

The trash remover 10 also includes a bar-type screen, generally referred to by the numeral 24. The bar type screen 24 is formed of a plurality of individual bars 26 which have their lower ends secured to the base 12 at the juncture of the upper end of the vertical wall 16 and the rear part of the forward portion of the bottom 14, as is best illustrated in FIGURE 4. The bars 26 slope upwardly and downstream and are of a length so that they project entirely out of the path of the flowing water.

A screen cleaner, generally referred to by the numeral 28, overlies the bar screen 24 and continuously removes trash accumulated thereon. The screen cleaner 28 includes a frame 30 which extends upwardly and downstream in generally parallel relation to the bar screen 24. The frame 30 is provided at its lower end with fittings 32 which are secured to the flanges 22. The upper end of the frame 30 is supported by an upright support 34 which is also carried by the base 12. The frame 32 is formed in two parts and the upper portions thereof are connected together by a transverse tie rod 36.

The screen cleaner 28 also includes a pair of transverse shafts 38 and 40 which extend between the side portions of the frame 32. The shafts 38 and 40 are provided with sprockets disposed inwardly of the side members of the frame 32. Endless chains 42 are entrained over the sprockets of the shafts 38 and 40. Incidentally, if the irrigation ditch is relatively narrow, a single, centrally located endless chain may suffice.

The screen cleaner 28 also includes a transverse bar 44 which extends between the endless chains 42 and is carried thereby. A plurality of spring fingers 46 are secured to the bar 44 so that they depend below the bar 44 when the bar is moving upwardly on the lower run of the chains 42. The number of spring fingers 46 correspond to the individual spaces between the bars 26 of the bar screen 24 so that the spring fingers 46 may project between the individual bars 26 and remove trash accumulated thereon, as is best illustrated in FIGURE 4.

A transverse conveyor, generally referred to by the numeral 48, is also carried by the base 12. The transverse conveyor extends across the base 12 with the lower end thereof disposed beneath the downstream end of the bar screen 24. The upper end of the transverse conveyor 48 extends beyond the base 12 and will overlie the surrounding ground remote from the irrigation ditch.

The transverse conveyor 48 includes a supporting frame 50 which has the lower end thereof secured to the left-hand flange 22 of the base 12 looking downstream. The upper end of the frame 50 is supported by an upright support 52 which, in turn, is supported by a pair of angle members 54 which are secured to the flanges 22 and extend to one side of the trough or base 12.

A lower shaft 56 and an upper shaft 58 are carried by the frame 50. The upper shaft 58 is preferably provided with an adjustable support 60 to facilitate the tensioning of a conveyor belt 62 which is supported by the shafts 56 and 58. A plurality of transverse cleats 64 are secured to the outer surface of the belt 62 and, if desired, the individual cleats 64 may be provided with fingers to facilitate the gripping of trash.

At this time, it is pointed out that the frame 50 of the transverse conveyor 48 also assists in the supporting of the bars 26 of the bar screen 24. It will be noted that rods 66 extend between the frame 50 and the undersides of the bars 26 to aid in the supporting of the bars 26. This is best illustrated in FIGURE 1.

It is the intention of this invention that the screen cleaner 28 continuously operate. Towards this end, there is provided a pulley 68 which is secured to an end of the shaft 38. A drive belt 70 is entrained over the pulley 68 and the opposite end of the drive belt 70 is entrained over a drive pulley 72. The drive pulley 72 may be secured to any type of motor including an electric motor or a gasoline engine. However, for economy purposes, it is proposed to provide a water wheel type of motor, generally referred to by the numeral 74. The water wheel type of motor 74 includes a pair of transversely aligned supports 76 which are secured to the flanges 22 and extend upwardly therefrom. The supports 76 carry transversely aligned pillow blocks 78 which in turn support for rotation a shaft 80. A plurality of paddles 82 are supported from the shaft 80 in radial, circumferentially spaced relation. The paddles 82 are positioned for movement into the channel defined by the base 12 so that they will be struck by the flowing water and the shaft 80 rotated. The pulley 72 will be secured to the shaft 80 when the motor is in the form of the water wheel 74. With slight variation, the water wheel may be positioned either up- or downstream relative to the trash remover.

The endless chains 42 which connect together the shafts 38 and 40 are part of the drive for the transverse conveyor 48. The shaft 40 carries a pulley 84 over which a drive belt 86 is entrained. A driven pulley 88 is secured to the shaft 56 to drive the transverse conveyor 48. At this time, it is pointed out that while the drive belt 86 is illustrated as being twisted to compensate for the right angled relationship between the shafts 40 and 56, the transverse conveyor 48 may be provided with a right angled drive to eliminate this twisting of the drive belt 86. Furthermore, the right angles drive may be of the gear reduction type to drive the transverse conveyor 48 at the desired speed.

In accordance with the invention, it is proposed that the base 12 be seated in an irrigation ditch so that it will receive all of the water normally flowing through the irrigation ditch and will cause the water to flow through the bar-type screen 24 so that trash carried by the flowing water will be collected on the screen 24. The screen cleaner 28 will then function to move the trash along the screen 24, beyond the upper end of the screen 24 and down onto the lower portion of the transverse conveyor 48. In order to prevent the accidental movement of the trash beyond the transverse conveyor 48, a back panel 90 is carried by the supporting frame 50 of the transverse conveyor. The transverse conveyor 48 will then move the trash to one side of the irrigation ditch where it will be stacked and may be removed when desired.

The simplicity of the trash remover will be obvious. Since the trash remover may be formed as a unit which may be readily set in an irrigation ditch, with minor modifications to the irrigation ditch, very little time is lost in the mounting of the trash remover. Further, since the trash remover may be driven by a water wheel, there is no need that the trash remover be attended or placed in a locality where power is available.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A trash remover for irrigation ditches comprising a trough for mounting longitudinally in an irrigation ditch for the passage of water, an upwardly and forwardly inclined screen in an intermediate portion of the trough, said trough comprising a bottom including a substantially vertical dropoff directly beneath the lower end of the screen for accelerating the flow of water therethrough and driving the trash upwardly thereon and for providing upper and lower water levels in said trough, said screen comprising a plurality of spaced, parallel, upwardly and forwardly inclined rods having their lower ends affixed to the trough bottom at the brink of the dropoff, and means for removing the trash from the screen, said means comprising an upwardly and forwardly inclined endless conveyor mounted on the trough in spaced parallelism with the screen, said conveyor comprising a plurality of spring fingers operable between the rods for moving the trash upwardly thereon and over the upper ends thereof, and a water wheel, operatively connected to the conveyor, operable in the trough on the upstream side of the dropoff for actuation by the accelerated water in the upper level of the trough.

2. The combination of claim 1, together with an inclined lateral endless conveyor mounted on the trough with its lower portion extending beneath the screen for receiving trash therefrom and connected to the first named conveyor for actuation thereby, said screen further comprising forwardly and downwardly inclined rods extending between the first-named rods and said lower portion of the second-named conveyor for supporting said first-named rods thereon, the second-named rods being spaced from the upper ends of said first-named rods for catching trash falling therebetween and conveying same to the second-named conveyor.

References Cited in the file of this patent

UNITED STATES PATENTS

| | | |
|---|---|---|
| 332,790 | Crisman et al. | Dec. 22, 1885 |
| 591,767 | Judson | Oct. 12, 1897 |
| 674,017 | Riensch | May 14, 1901 |
| 840,973 | Todd | Jan. 8, 1907 |
| 1,076,483 | Collar | Oct. 21, 1913 |
| 1,079,975 | Chambers et al. | Dec. 2, 1913 |
| 1,331,935 | Lee | Feb. 24, 1920 |
| 1,799,457 | Cuttle et al. | Apr. 7, 1931 |
| 2,009,005 | Schofield et al. | July 23, 1935 |